United States Patent [19]

Parham et al.

[11] Patent Number: 4,949,005
[45] Date of Patent: Aug. 14, 1990

[54] TANTALA-SILICA INTERFERENCE FILTERS AND LAMPS USING SAME

[75] Inventors: Thomas G. Parham, Gates Mills, Ohio; Seshu Desu, Blacksburg, Va.; Charles D. Tschetter, Mayfield Village, Ohio

[73] Assignee: General Electric Company, Schenectady, N.Y.

[21] Appl. No.: 270,313

[22] Filed: Nov. 14, 1988

[51] Int. Cl.$^5$ .......................... H01J 9/20; H01K 1/32
[52] U.S. Cl. .................................. 313/112; 313/315; 427/10; 427/107; 350/1.7; 350/166; 428/432
[58] Field of Search ............... 313/112, 113, 315, 579; 427/107, 10; 350/1.7, 164, 166; 428/432

[56] References Cited

U.S. PATENT DOCUMENTS

| | | |
|---|---|---|
| 4,048,347 | 9/1977 | Schrank et al. ...................... 427/10 |
| 4,588,923 | 5/1986 | Hoegler et al. ...................... 313/579 |
| 4,663,557 | 5/1987 | Martin, Jr. et al. ................. 313/112 |
| 4,689,519 | 8/1987 | Ooms et al. ......................... 313/112 |
| 4,701,663 | 10/1987 | Kawakatsu et al. ................ 313/112 |
| 4,734,614 | 3/1988 | Kuus ................................... 313/112 |
| 4,769,290 | 9/1988 | Hettich et al. ...................... 428/432 |
| 4,775,203 | 10/1988 | Vakil et al. .......................... 350/1.7 |

*Primary Examiner*—Kenneth Wieder
*Attorney, Agent, or Firm*—Edward M. Corcoran; Stanley C. Corwin; Fred Jacob

[57] ABSTRACT

Thin film interference filters consisting of alternating layers of tantala and silica suitable for high temperature use on electric lamps have been made by heat treating at 550°–675° C. before using the filters at high temperature. Tungsten halogen lamps made with such heat treated filters have been thermally cycled for thousands of cycles at 900° C. with no film loss and with satisfactory optical performance.

38 Claims, 3 Drawing Sheets

Fig. 3
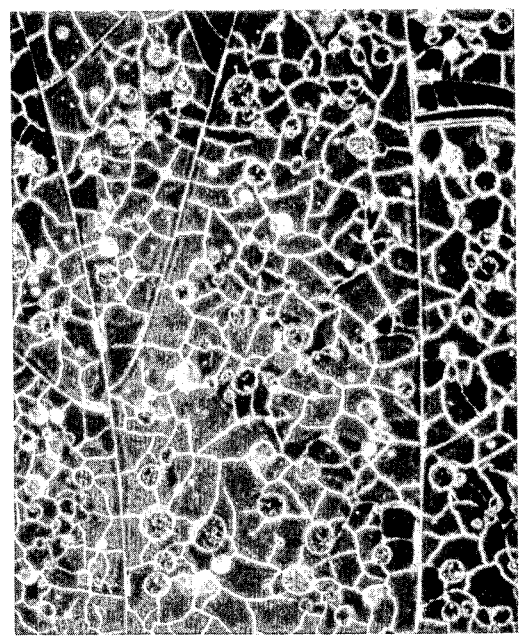
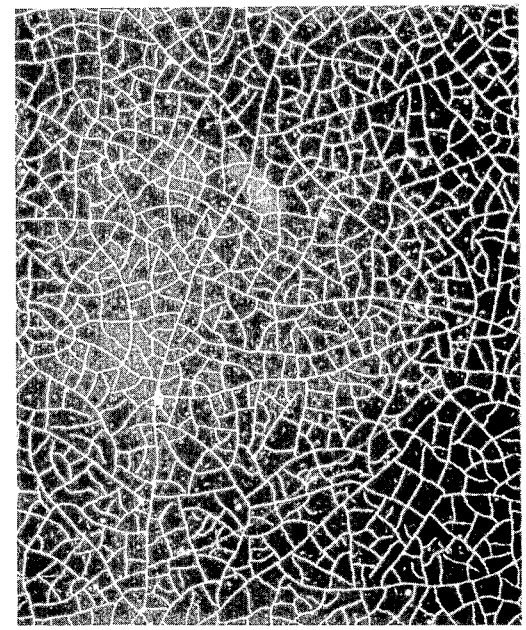
Fig. 4

TANTALA-SILICA INTERFERENCE FILTERS AND LAMPS USING SAME

BACKGROUND OF THE INVENTION

1. Field of the Invention

This invention relates to light interference filters made of alternating layers of tantala and silica and their use on lamps. More particularly, this invention relates to stress relieved interference filters made of alternating layers of tantala and silica having of at least twelve total layers and exhibiting (i) a randomized crack pattern when viewed at 50 times magnification and (ii) diffuse reflection of no greater than about 5% at a wavelength of from 1500-2000 nm, and the use of such filters with electric lamps.

2. Background of the Disclosure

Thin film optical coatings known as interference filters which comprise alternating layers of two or more materials of different indices of refraction are well known to those skilled in the art. Such coatings or films are used to selectively reflect or transmit light radiation from various portions of the electromagnetic radiation spectrum such as ultraviolet, visible and infrared radiation. These films or coatings are used in the lamp industry to coat reflectors and lamp envelopes. One application in which these thin film optical coatings are useful is to improve the illumination efficiency or efficacy of incandescent lamps by reflecting infrared energy emitted by a filament or arc back to the filament or arc while transmitting the visible light portion of the electromagnetic spectrum emitted by the filament. This lowers the amount of electrical energy required to be supplied to the filament to maintain its operating temperature. In other lamp applications where it is desired to transmit infrared radiation, such filters can reflect the shorter wavelength portions of the spectrum, such as ultraviolet and visible light portions emitted by the filament or arc and transmit primarily the infrared portion in order to provide heat radiation with little or no visible light radiation. Such an application of this latter type would include a typical radiant heater for residential or industrial use where visible radiation emitted by the heater is unwanted.

Such interference filters useful for applications where the filter will be exposed to high temperature in excess of 500° C. or so have been made of alternating layers of tantala (tantalum pentoxide $Ta_2O_5$) and silica ($SiO_2$), wherein the silica is the low refractive index material and the tantala is the high refractive index material. Such filters and lamps employing same are disclosed, for example, in U.S. Pat. Nos. 4,588,923; 4,663,557 and 4,689,519. In such lamp applications the interference filters, which are applied on the outside surface of the vitreous lamp envelope containing the filament within, often reach operating temperatures in the range of from about 800°-900° C. These interference filters or coatings have been applied primarily using evaporation or sputtering techniques which, while capable of producing a satisfactory interference filter, has its limitations with respect to not being able to apply a uniform coating to any but a flat surface. In the case of tubing used for making lamps, the tubing must be rotated in the sputtering or vacuum evaporation chamber as the coating is being applied. This technique does not lend itself to applying uniform coatings to curved objects. Moreover, this technique is rather costly.

Consequently, attempts have been made to make such interference filters using a solution deposition technique such as is disclosed in U.S. Pat. No. 4,701,663. In this patent, a film of alternating layers of tantala and silica was not produced. Instead, films were made of alternating layers of titania and silica with the suggestion that these techniques might also apply to tantala-silica films. However, this patent also discloses that severe stresses occur when the titania-silica films are baked at temperatures of from about 500°-600° C., such that the films crack and peel off a silica substrate. The basic thrust of this patent relates to the addition to the silica layers of significant amounts of stress reducing agents, such as phosphorus pentoxide and boron trioxide, which are added in order to reduce the cracking and peeling problem. However, when these additives are added to the silica layers of the filter as taught in this patent, the optical properties are significantly reduced thus resulting in poor filters. Moreover, the addition of such additives to the silica in the significant amounts taught changes the nature of the silica material in the filter to that of a relatively low melting glass.

U.S. Pat. No. 4,734,614 recognizes the problems of severe stress formation associated with the use of interference filters consisting of alternating layers of silica and tantala when employed at high temperatures. Thus, lines 54 et. seq., in column 1 teach that tantala has limited physical and chemical stability and crystallizes to a polycrystalline form after 30 minutes at 800° C. which produces stress cracks visible as craquele. This results in a filter that scatters both visible and infrared radiation, thereby rendering it unsuitable. Niobium pentoxide is suggested as a replacement for the tantala.

Accordingly, a need exists for thin film optical coating interference filters comprising alternating layers of tantala and silica which can be produced by a process which will apply a relatively uniform coating to a complex shape and which does not result in a film containing such stresses that the film cracks and peels off the substrate.

SUMMARY OF THE INVENTION

It has now been discovered that relatively low stress interference filter thin film optical coatings consisting essentially of alternating layers of tantala and silica having relatively low light scattering and suitable for use at high temperatures are obtained by employing a chemical vapor deposition (CVD) process and preferably a low pressure chemical vapor deposition (LPCVD) process to produce the film on a suitable substrate such as quartz, followed by heat treating the so-produced film to avoid the catastrophic stress formation which results in poor adhesion and peeling of the film and relatively high light scattering. Such films made according to this invention exhibit relatively low stress and low light scattering, are strongly adherent to a quartz substrate and exhibit good optical characteristics. Thus, the present invention relates to an interference filter consisting essentially of alternating layers of tantala and silica having a total of at least twelve layers and exhibiting (i) a randomized crack pattern when viewed at 50 times optical magnification and (ii) diffuse reflection of no greater than about 5% at a wavelength of from about 1500-2000 nm. Preferably, these interference films will have a total of at least 16 alternating layers of tantala and silica, more preferably at least 20 layers of tantala and silica and still more preferably a total of at least 24 layers. Still further, such films have been produced according to the present invention with a diffuse reflection at a wavelength of from between about 1500-2000 nm of less than 4% and even less than 3%.

An essential and critical feature to the strongly adherent, relatively low stress and low light scattering tantala-silica interference film of this invention is the subsequent thermal treatment of the film after it has been applied to the substrate. In particular, after the film deposition process is completed the coated substrate must be heated to a temperature of between about 550°-675° C. and held within this temperature range for a period of from about 0.5-5 hours and preferably 1-5 hours. In a preferred embodiment, the 550°-675° C. heat treatment is followed by heating to at about the temperature which the films will experience in service. Holding or heat soaking of the films at a temperature between about 550°-675° C. is critical in producing the films of the present invention to avoid catastrophic stresses induced by crystallization of the orthorhombic tantalum pentoxide crystals. In marked contrast, if the tantala-silica films are not given the thermal treatment of this invention, the interference filters exhibit severe stresses which result in severe peeling of the film from the substrate, little or no mechanical adhesion of the film to the substrate and significant light scattering after being exposed to elevated temperatures in excess of about 600° C.

These films have been produced on quartz substrates, including quartz tubing. Halogen incandescent lamps of the type illustrated in FIG. 1 have been made from quartz tubing that was coated with these films both prior to lamp fabrication and after lamp fabrication. These lamps were operated at a lamp temperature such that the exterior surface of the quartz was at about 900° C. and exhibited relatively low light scattering, no peeling and good adhesion of the coating, even after subjecting the lamp to the thermal cycling produced by turning the lamp on and off for thousands of cycles.

By tantala is meant essentially tantalum pentoxide $Ta_2O_5$ and by silica is meant essentially at least about 95% $SiO_2$. By way of illustration, a film consisting essentially of a total of 24 alternating layers of silica and tantala in the context of the present invention means that the combined total of both the silica and the tantala layers is 24. There will be 12 layers of silica alternating with 12 layers of tantala.

When employing a CVD or LPCVD process to deposit the interference films of this invention on a quartz substrate, the substrate or article is placed in a deposition chamber at a temperature of from about 350°-600° C. After the article has reached temperature, a gaseous precursor of either tantala or silica is introduced into the chamber where it is reacted or decomposed to form a layer of either tantala or silica on the substrate. The process is repeated for the other oxide layer and repeated, alternating the silica and tantala deposition until the desired interference filter is formed.

Interference filters applied on a quartz substrate and heat treated according to this invention exhibit less than 5%, and generally less than 1% loss of the interference film from the substrate, as measured by a Scotch tape adhesion test, after being subject to thousands of cycles of 900° C. thermal cycling. In contrast, similar films that have not been heat treated generally exhibit over 50% film loss when thermally cycled.

BRIEF DESCRIPTION OF THE DRAWINGS

FIG. 3 is a photograph taken at a magnification of 50X of an LPCVD deposited tantala-silica interference filter on quartz that was heated to 800° C. without having had the heat treatment of the present invention.

FIG. 4 is a photograph taken at a magnification of 50X of an LPCVD deposited tantala-silica interference filter on quartz that was thermally treated according to the present invention before being heated to 800° C.

DETAILED DESCRIPTION

Figure 1:
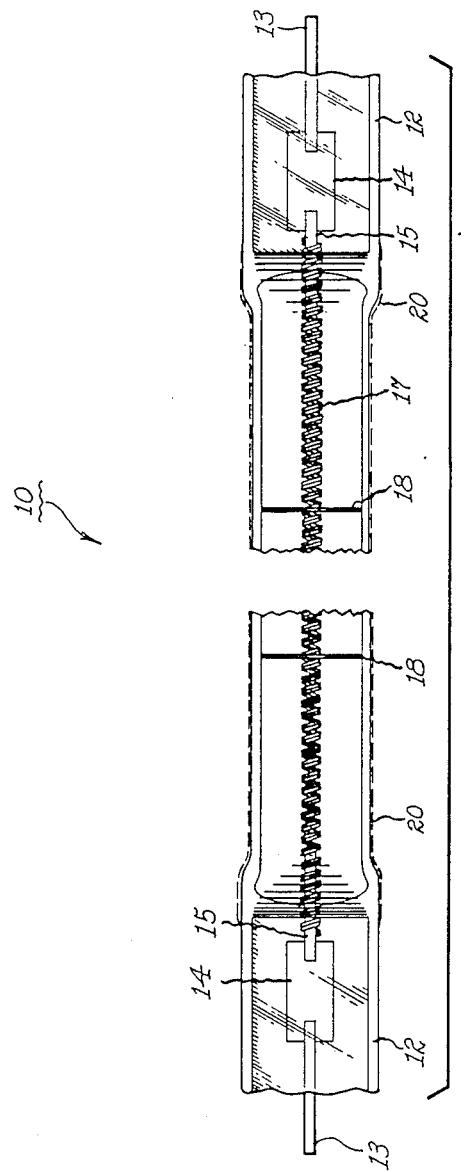
FIG. 1 is a side view of an elongated tungsten halogen lamp having a tantala-silica interference film according to the present invention on the outer surface.

FIG. 1 illustrates one embodiment of the present invention comprising a lamp, the outer surface of which contains a tantala-silica interference filter according to the present invention which reflects infrared radiation back to the filament wherein it is converted into visible radiation. Lamps of this type have been made according to the present invention wherein the interference filter consists of 12 layers of silica and 12 layers of tantala alternating with each other for a total of 24 layers at an overall total film thickness of about 4.1 microns, which have increased the efficacy of the lamp by an amount of from about 20-50%.

The lamp illustrated in FIG. 1 comprises envelope 10 made out of a vitreous, light transmissive material capable of withstanding high temperatures of about 800° C. which, in this case, is quartz. Each end of envelope 10 has a pinch seal portion 12 through which is sealed an inlead connector 13 electrically and mechanically attached by suitable means, such as welding, to molybdenum foil 14 which is hermetically sealed and embedded in the pinch seal portion 12 of the lamp. Leads 15 made out of a suitable refractory metal, such as molybdenum or tungsten, are attached to the other end of molybdenum foils 14 at one end and at the other end are connected to tungsten filament 17 which is supported on its axis within the envelope by a plurality of suitable supporting members 18, such as tungsten spiral wire supports of the type disclosed in U.S. Pat. No. 3,168,670. The thin film optical interference filter 20 of the present invention is on the outer surface of the lamp as a continuous coating.

As set forth above, film 20 consists of alternating layers of tantala and silica arranged so as to adjust the pass-band and the stop-band characteristics of the emitted radiation of the lamp. The total number of combined layers of silica and tantala will be at least 12, preferably at least 16, more preferably at least 20 and still more preferably at least 24. In one embodiment, interference film 20 will reflect the infrared radiation emitted by tungsten filament 17 back to the filament, while transmitting the visible radiation. Alternately, the interference film comprising the alternating layers of tantala and silica may be designed so as to reflect visible radiation while transmitting infrared radiation. In yet another embodiment, film 20 can be designed so as to transmit ultraviolet radiation or radiation within a particular section of the total light spectrum, while reflecting that light which it is desired not to transmit. Thus, the film may also be employed to yield a lamp transmitting mostly ultraviolet radiation and also to alter the general color transmission characteristics of the lamp in the visible light region.

The foregoing is intended to be an illustrative, but non-limiting example of the present invention.

As set forth above, the interference filter thin film optical coatings of the present invention are prepared by a CVD process and preferably a LPCVD process wherein a suitable metal oxide precursor reagent or reagents for each material of the film is separately introduced into a decomposition chamber wherein it is decomposed or reacted to form the metal oxide on a heated substrate. Separate layers of silica and tantala are applied onto the substrate in this fashion until the desired filter design is achieved. Such chemical vapor deposition techniques are well known to those skilled in the art and are disclosed in, for example, U.S. Pat. Nos. 4,006,481; 4,211,803; 4,393,097; 4,435,445; 4,508,054; 4,565,747; and 4,775,203. In forming the metal oxide films of tantala and silica on a substrate in accordance with the present invention, the substrate or object is positioned within a deposition chamber. The chamber is generally contained within a furnace so that the object reaches the desired temperature to achieve the reaction or decomposition and concomitant deposition of the tantala or silica film on the object. These temperatures will generally range between about 350°–600° C., depending upon the particular reagent used. For an LPCVD process, the deposition chamber is evacuated and a suitable organometallic precursor of the desired metal oxide, either of tantala or of silica, in the vapor state is permitted to flow through the deposition chamber by any suitable means. When the reagent flows into the deposition chamber it is decomposed to deposit a film of either tantala or silica on the substrate. When the desired film thickness is achieved the reagent flow is stopped, the chamber evacuated and the reagent for the other material is flowed into the deposition chamber until the desired thickness of that material is achieved. The process is repeated until the desired multiple layer interference filter is formed.

Illustrative, but non-limiting examples of compounds suitable for use in the present invention for depositing a silica film from LPCVD include diacetoxy dibutoxy silane, tetraacetoxy silane and silicon tetrakis diethyloxyamine. Suitable reagents for use in the present invention useful for depositing a film of tantala employing LPCVD include tantalum pentaethoxide, tantalum isopropoxide, tantalum methoxide, tantalum butoxide, mixed tantalum alkoxides and tantalum pentachloride and water and/or oxygen. No carrier gas is required in the deposition chamber to facilitate movement of the reagent through the chamber, although an inert carrier gas can also be employed, if desired. The pressure in the chamber during the deposition process will, in general, range between about 0.1–2.0 torr, depending upon the reagent used and the temperature of the substrate. Atmospheric pressure may be employed for a CVD process. The flow rate of the gaseous reagent in the deposition chamber will generally range between about 10–2,000 SCCM, depending upon the size of the reaction chamber, the reagent, presence of a carrier gas and desired rate of deposition, etc. Individual layers of tantala and silica can be uniformly deposited employing this process having a uniformity of film thickness within plus or minus about 5% and have been successfully deposited on both flat and curved substrates. Such uniform films of tantala and silica can be formed ranging from about 100 to about 20,000 Angstroms in thickness. In forming the alternating layers of silica and tantala of the interference filter of the present invention, a film of tantala or silica will first be deposited and flow of the particular silica or tantala reagent to the chamber will be stopped, the chamber evacuated, and then flow of the reagent which is a precursor or reactant for the other film, either tantala or silica, will be introduced into the chamber. The process is repeated until the desired number of layers for the interference filter have been formed.

After the desired interference filter has been formed on the desired substrate or object in the deposition chamber, the object or substrate is then thermally treated by heating to a critical temperature range of within about 550°–675° C. and held within this temperature range for a period of from about 1–5 hours in order to effect formation of tantala crystals or crystallites without significant crystal growth of the individual tantala crystals. This heating can be accomplished by holding the coated substrate at or within a particular temperature regime within the 550°–675° C. range or by slowly heating the film coated substrate through said temperature range. After deposition the coated substrates or objects may be cooled down somewhat, for a short period of time, before being heated to the 550°–675° C. temperature range. For example, interference films on quartz containing a total of 24 layers of tantala and silica have been taken out of a 450°–500° C. deposition chamber and cooled to 200° C. for 15 minutes before being placed in a 500° C. furnace and heated to the 550°–675° C. temperature, with no adverse effects to the films after being used on lamps at 800° C. After being heated up and held at a temperature ranging between 550°–675° C. for a time sufficient to result in the formation of the tantala crystallites, the coated substrate or object is preferably heated to a temperature about as high as the temperature to which the interference film will be exposed during use and held at that temperature for about 0.1–5 hours. The heat treatment may be accomplished in-situ in the deposition chamber after the film has been formed or it may be accomplished ex-situ. For example, coated substrates may be taken out of a deposition chamber at a temperature of, i.e., 500° C., and placed into a furnace at 500° C., heated up at a rate of 1° C./min to a temperature of 550°–675° C. for 1–5 hours, followed by heating at 1° C./min to 800° C. and held at 800°C. for 0.1–5 hours before being cooled to room temperature. Tungsten halogen lamps of the type shown in FIG. 1 operating at 800° C. and having coatings that were treated in such a fashion have exhibited no peeling of the film even after being subject to thousands of thermal cycles between room temperature and 800° C. or 900° C.

If the coated objects are heated to a temperature in excess of about 675° C. (i.e., $\gtrsim$700° C.) prior to being given the 550°–675° C. heat treatment and then cooled to room temperature, catastrophic stresses will develop in the film with concomitant poor adhesion to the substrate and poor optical properties. Tantala crystals are orthorhombic with the c-axis having the longest dimension. Significant crystal growth of individual tantala crystals or crystallites results in catastrophic stress induced into the tantala film due to the anisotropic growth along the c-axis. While not wishing to be held to any particular theory, it is believed holding the film within the temperature range of 550°–675° C. results in the formation of a great number of tantala crystallites without significant growth of the individual crystallites and the concomitant formation of the catastrophic stress that results from such crystal growth. Preferably the temperature will be between about 600°-675° C., because at temperatures below 600° C., crystallite formation may take an excessively long time and not be commercially feasible. The tantala film as deposited in a CVD or in an LPCVD reaction chamber at a temperature of 350°-550° C. is amorphous and the subsequent heat treatment at 550°-675° C. is believed to permit the formation of crystallites in an amount sufficient to avoid the formation of the catastrophic stress resulting from the anisotropic growth of the orthorhombic tantala crystallites.

FIG. 3 is a photograph taken at 50X magnification of a section of a tantala/silica interference filter deposited in the laboratory on a one inch square, flat quartz substrate employing an LPCVD process and cooled down to room temperature after film deposition without being given any heat treatment after deposition. After being at room temperature for several months it was placed in an 800°C. oven for one hour. In marked contrast, FIG. 4 is also at 50X magnification of a similar film deposited on a flat, one inch square quartz substrate which, after film deposition, was taken out of the deposition chamber and placed into a 500° C. oven where it was heated up at a rate of 1° C./minute from 500° C. to a temperature of 650° C. at which it was held for two hours and then heated at a rate of 1° C./min to a temperature of 800° C., at which it was held for two hours. It was then taken out of the furnace and cooled down to room temperature. After being at room temperature for several months it was then placed in an 800°C. oven for one hour.

One immediately notices the striking difference between the two films. The heat treated film in FIG. 4 shows a fine, randomized crack pattern, somewhat like fine craquele, the light lines being scattered light. In contrast, in FIG. 3 the crack pattern is substantially larger with much more of the film lifted from the substrate as evidenced by the larger lines, as well as a significant amounts of film removed from the substrate as can be seen by the small circular areas in the photograph. The photographs shown in FIGS. 3 and 4 were taken with a Zeiss Axioplan TM microscope under dark field light conditions. Adhesion tests were made of films on one inch square flat quartz substrates similar to those shown in FIGS. 3 and in FIG. 4 by taking ordinary ½' Scotch brand Magic Tape and rubbing it onto each of the films, followed by pulling the tape off at an angle perpendicular to the substrate. The films that were not heat treated exhibited more than about 50% film loss with this test, whereas the heat treated films exhibited less than 1% film loss. The films consisted of a total of 24 alternating layers of silica and tantala (12 of tantala and 12 of silica) at a total film thickness of about 4.1 microns. The silica was deposited by the decomposition of diacetoxy dibutoxy silane at 450°-500° C. and the tantala from tantalum ethoxide at about the same temperature.

Figure 2:
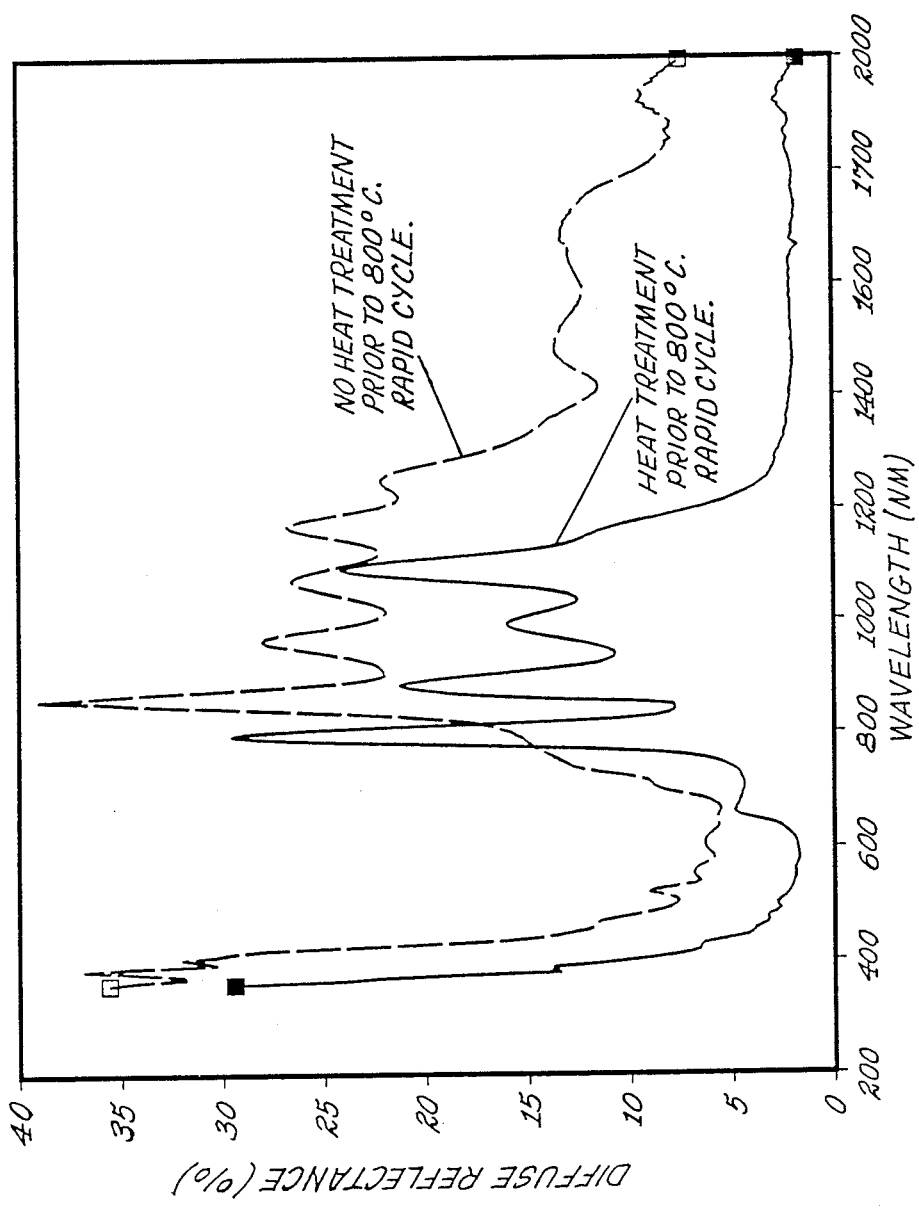
FIG. 2 is a graph illustrating diffuse reflectance as a function of wavelength for an interference film of the present invention after being subject to a temperature of 800° C. for one hour, with and without having first had the heat treatment of the present invention.

FIG. 2 is a graph of diffuse reflectance as a function of wavelength of films corresponding to those shown in FIGS. 3 and 4. Thus, the graph corresponding to the film of FIG. 3 is shown in FIG. 2 as the dashed line (no heat treatment), whereas the solid line shown in FIG. 2 corresponds to the film shown in FIG. 4. One immediately sees a substantial difference in the diffuse reflection properties between the two films. The heat treated film exhibits less than 3% diffuse reflectance at a wavelength of from between 1500 and 2000 nm, whereas the film that was not heat treated exhibits an average of more than 10% diffuse reflection at the same wavelength.

The Table set forth below shows average values, as a function of wavelength, for transmittance (T) and reflectance (R) of films corresponding to those in FIGS. 3 and 4 having no heat treatment and heat treatment, respectively, cooled down to room temperature for a substantial period of time and then placed in an 800° C. oven for one hour.

|  | Heat Treatment (%) | No Heat Treatment (%) |
| --- | --- | --- |
| TOT T Visible (400-700) | 92 | 80 |
| Near IR (800-1200) | 8 | 12 |
| IR (1300-1700) | 20 | 18 |
| SPEC T Visible | 80 | 65 |
| Near IR | 6 | 10 |
| IR | 16 | 16 |
| Diffuse T Visible | 12 | 15 |
| Near IR | 2 | 3 |
| IR | 4 | 4 |
| TOT R Visible | 10 | 15 |
| Near IR | 84 | 85 |
| IR | 80 | 70 |
| SPEC R Vis | 7 | 7 |
| Near IR | 69 | 60 |
| IR | 78 | 55 |
| Diffuse R Vis | 3 | 8 |
| Near IR | 15 | 25 |
| IR | 2 | 15 |

What is claimed is:

1. An interference filter thin film optical coating produced by a low pressure chemical vapor deposition process and consisting essentially of alternating layers of tantala and silica having a total of at least 12 layers and exhibiting (i) a randomized crack pattern when viewed at 50 times optical magnification and (ii) diffuse reflection of no greater than about 5% at a wavelength of from about 1500-2000 nm.

2. The filter of claim 1 wherein said silica has an $SiO_2$ content of at least about 95%.

3. The filter of claim 2 wherein the total number of layers is at least about 16.

4. The filter of claim 3 wherein the total number of layers is at least about 20.

5. The filter of claim 4 wherein the total number of layers is at least about 24.

6. The filter of claim 5 exhibiting less than about 4% diffuse reflection at a wavelength between about 1500-2000 nm.

7. As a composition of matter, a quartz substrate supporting an interference filter thin film optical coating produce by a low pressure chemical vapor deposition process and exhibiting good adhesion to said quartz substrate, said filter consisting essentially of alternating layers of tantala and silica having a total of at least 12 layers and exhibiting (i) a randomized crack pattern when viewed at 50 times optical magnification and (ii) diffuse reflection of no greater than about 5% at a wavelength of from about 1500-2000 nm.

8. The composition of claim 7 wherein said silica has an $SiO_2$ content of at least about 95%.

9. The composition of claim 8 wherein the total number of layers is at least about 16.

10. The composition of claim 9 wherein the total number of layers is at least about 20.

11. The composition of claim 10 wherein the total number of layers is at least about 24.

12. The composition of claim 11 exhibiting less than about 4% diffuse reflection at a wavelength between about 1500–2000 nm.

13. The composition of claim 9 wherein less than 5% of said coating is removed from said substrate as measured by a Scotch tape adhesion test after said composition has been heated to a temperature of at least about 800° C. for at least about one hour.

14. The composition of claim 12 wherein less than 5% of said coating is removed from said substrate as measured by a Scotch tape adhesion test after said composition has been heated to a temperature of at least about 800° C. for at least about one hour.

15. The product of claim 13 wherein less than 5% of said coating is removed from said substrate as measured by a Scotch tape adhesion test after said composition has been heated to a temperature of at least about 800° C. for at least about one hour.

16. The product of claim 15 wherein said silica is at least about 95% $SiO_2$.

17. An electric lamp comprising a light transmissive vitreous envelope enclosing an electric light source and an interference filter produced by a low pressure chemical vapor deposition process provided on the surface of said envelope and exhibiting good adhesion thereto, said filter consisting essentially of alternating layers of tantala and silica having a total of at least 16 layers and exhibiting (i) a randomized crack pattern when viewed at 50 times optical magnification and (ii) diffuse reflection of no greater than about 5% at a wavelength of from about 1500–2000 nm.

18. The lamp of claim 17 wherein said silica has an $SiO_2$ content of at least about 95%.

19. The lamp of claim 18 wherein the total number of layers is at least about 20.

20. The lamp of claim 19 exhibiting less than about 4% diffuse reflection at a wavelength between about 1500–2000 nm.

21. The lamp of claim 20 wherein said light source is a filament or electric arc.

22. The lamp of claim 21 wherein said envelope is hermetically sealed.

23. The lamp of claim 22 wherein said envelope is quartz.

24. The lamp of claim 17 wherein less than 5% of said filter is removed from said lamp envelope as measured by a Scotch tape adhesion test after said composition has been heated to a temperature of at least about 800° C. for at least about one hour.

25. The lamp of claim 21 wherein less than 5% of said filter is removed from said lamp envelope as measured by a Scotch tape adhesion test after said composition has been heated to a temperature of at least about 800° C. for at least about one hour.

26. The lamp of claim 23 wherein less than 5% of said filter is removed from said lamp envelope as measured by a Scotch tape adhesion test after said composition has been heated to a temperature of at least about 800° C. for at least about one hour.

27. A process for making a tantala/silica interference film on a vitreous substrate useful at temperatures in excess of about 600° C. which comprises depositing alternating layers of tantala and silica on said substrate by a low pressure chemical vapor deposition process for a total of at least 16 layers to form a coated substrate, followed by heating the coated substrate at a temperature of from about 550°–675° C. for about 0.5–5 hours before exposing said coated substrate to said elevated temperature in excess of 675° C.

28. The process of claim 27 wherein, after being heated to 550°–675° C. for 1–5 hours, said coated substrate is further heated to a temperature about as high as that temperature to which said film will be exposed for a period of about 0.1–5 hours.

29. The process of claim 27 wherein said filter consists of at least 20 total layers.

30. The process of claim 29 wherein said substrate comprises quartz.

31. The process of claim 30 wherein said film on said substrate exhibits less than about 4% diffuse reflection at a wavelength between about 1500–2000 nm.

32. The process of claim 31 wherein said silica contains at least about 95 wt. % $SiO_2$.

33. The process of claim 32 wherein, after being heated at said 550°–675° C., is further heated to a temperature about as high as the temperature at which said film will be used for a period of about 0.1–5 hours.

34. The process of claim 27 wherein said coated substrate is heated at a temperature of from about 600°–675° C. before exposing said coated substrate to said elevated temperature.

35. The process of claim 28 wherein said coated substrate is heated at a temperature of from about 600°–675° C. before exposing said coated substrate to said elevated temperature.

36. The process of claim 32 wherein said coated substrate is heated at a temperature of from about 600°–675° C. before exposing said coated substrate to said elevated temperature.

37. As a product-by-process, an interference filter thin film optical coating on a vitreous substrate and exhibiting good adhesion thereto wherein said film consists essentially of alternating layers of tantala and silica having a total of at least 16 layers and exhibiting (i) a randomized crack pattern when viewed at 50 times optical magnification and (ii) diffuse reflection of no greater than about 5% at a wavelength of from about 1500–2000 nm, said film formed by depositing alternating layers of silica and tantala on said substrate by a chemical vapor deposition process to form a coated substrate, followed by heating the coated substrate to a temperature of about 550°–675° C. and holding same within said 550°–675° C. temperature range for about 1–5 hours.

38. The produce of claim 37 wherein less than 5% of said coating is removed from said substrate as measured by a Scotch tape adhesion test after said composition has been heated to a temperature of at least about 800° C. for at least about one hour.

* * * * *